A. W. Streeter,
Bit Stock,
Nº 12,289.        Patented Jan. 23, 1855.

Witnesses:
Thos. B. Montague
George W. Chase.

Inventor:
Abel W. Streeter

UNITED STATES PATENT OFFICE.

ABEL W. STREETER, OF SHELBURNE FALLS, MASSACHUSETTS.

FASTENING CENTER-BITS.

Specification forming part of Letters Patent No. 12,289, dated January 23, 1855; Reissued June 14, 1859, No. 737.

*To all whom it may concern:*

Be it known that I, ABEL W. STREETER, of Shelburne Falls, in the county of Franklin, in the State of Massachusetts, have invented a new and Improved Center-Bit Fastening; and I do hereby declare that the following is a full and exact description thereof, reference being had to the accompanying drawings and to the letters of reference marked thereon.

The nature of my invention consists in providing the socket of a bit-stock with a stationary catch, upon one of the sides of said socket, and also surrounding said socket with a revolving ring which has attached to its interior surface, a cam or bearer, which cam, operated by said ring, presses the shank of the bit or other implement inserted within the socket, firmly upon the catch and securing the bit within the socket, all which will more fully appear from the following description, and the accompanying drawings, in which—

Figure 1:
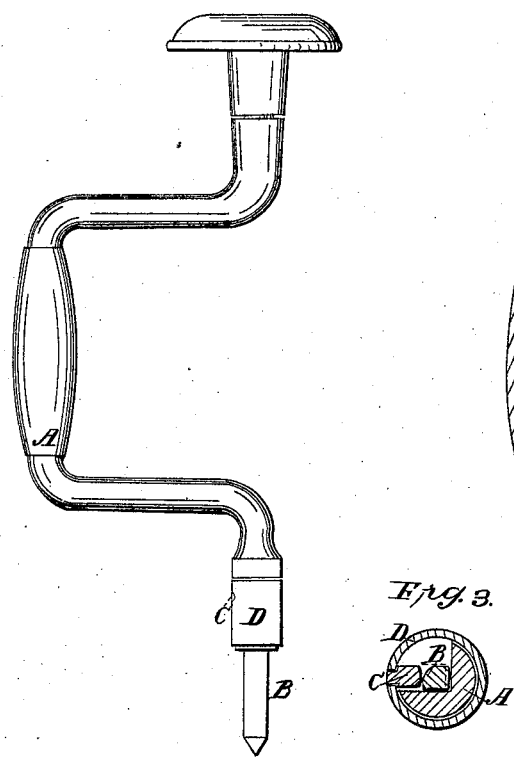
Figure 2:
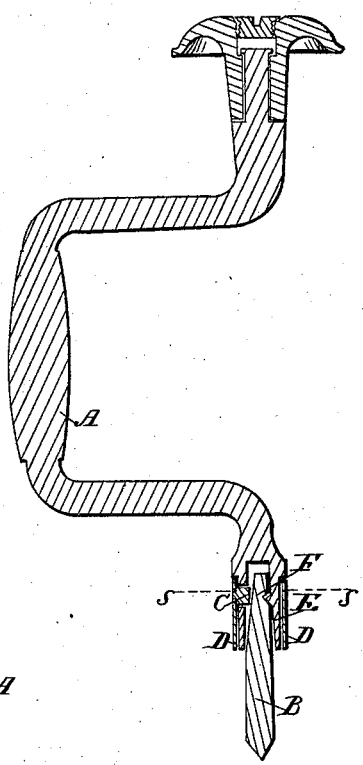
Figure 3:
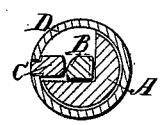

Figure 1, is a perspective view, Fig. 2 is a transverse section, and Fig. 3, an enlarged cross section through S S, of Fig. 2.

I construct my bit-stock in any of the usual forms, with the exception of the end forming the socket, in which I form a frusto-pyramidal recess, which I denominate the socket, to receive the bit; said recess being enlarged sufficiently upon one of its sides to allow of the introduction of the shank of the bit over the stationary catch E, which I form upon the opposite side of said socket. Also a recess, opening from said socket to the outer surface of the stock A, to admit the insertion of the cam or bearer C. Upon the exterior surface of this end of the stock forming the socket, I place the ring D, surrounding the stock A, and so fitted, as to admit of a quarter revolution upon and around said stock. Within this ring, and firmly affixed to its interior surface, is the cam or bearer C, which, being operated by said ring is turned from one of the squares or sides of the shank B, to another square or side at right angles to the first mentioned side, and opposite to the one in which is formed the notch F, accurately fitting upon the catch E. In order to use this improvement, it is necessary to place the cam in the open space shown in Fig. 3, on a side of the socket at right angles with the catch E, then insert the shank of the bit, entering the notch F upon the catch E, and then, by a quarter revolution of the ring D, bring the cam or bearer upon the side of the shank opposite said notch F and catch E, when the cam or bearer by pressing upon said shank B will firmly secure the shank upon the catch and consequently confine the same within the socket, without the possibility of slipping off the catch and becoming liberated from the socket when not designed by the operator, which very frequently occurs with the braces in common use and having for their fastening the ordinary rocker lever catch and spring.

I do not claim the invention of a movable or revolving ring as a means of operating a bit fastening, the same having been previously employed, but What I do claim as my invention and desire to secure by Letters Patent is—

The stationary catch E, in connection with the cam or bearer C, for the purposes herein specified, the whole being combined arranged and operated substantially as set forth.

ABEL W. STREETER.

Witnesses:
THOS. B. MONTAGUE,
GEORGE W. CHASE.

[FIRST PRINTED 1913.]